United States Patent
Horie et al.

(10) Patent No.: US 8,272,517 B2
(45) Date of Patent: Sep. 25, 2012

(54) WATER-PROOF SOUND-TRANSMITTING MEMBRANE, METHOD FOR PRODUCING THE WATER-PROOF SOUND-TRANSMITTING MEMBRANE, AND ELECTRICAL APPLIANCE INCLUDING THE WATER-PROOF SOUND-TRANSMITTING MEMBRANE

(75) Inventors: Yuri Horie, Osaka (JP); Yuuichi Abe, Osaka (JP); Kouji Furuuchi, Osaka (JP); Kousei Takiishi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 13/009,510

(22) Filed: Jan. 19, 2011

(65) Prior Publication Data

US 2011/0143114 A1 Jun. 16, 2011

Related U.S. Application Data

(63) Continuation of application No. PCT/JP2010/050711, filed on Jan. 21, 2010.

(30) Foreign Application Priority Data

Jan. 21, 2009 (JP) ................. 2009-011356

(51) Int. Cl.
*B01D 39/00* (2006.01)
*B01D 29/00* (2006.01)
*G10K 11/00* (2006.01)
*D02J 1/06* (2006.01)

(52) U.S. Cl. ................... 210/500.36; 210/490; 181/175; 181/167; 181/150; 156/229; 264/288.8

(58) Field of Classification Search ............ 210/500.36, 210/490; 428/311.51, 319, 364, 219; 181/175, 181/167, 150; 29/594; 381/86, 355; 156/229; 264/288.8
See application file for complete search history.

(56) References Cited

U.S. PATENT DOCUMENTS

| | | | | |
|---|---|---|---|---|
| 4,385,093 | A | | 5/1983 | Hubis |
| 5,225,131 | A | * | 7/1993 | Tamaru et al. ................. 264/113 |
| 5,488,766 | A | * | 2/1996 | Gerry et al. ..................... 29/600 |
| 5,814,405 | A | | 9/1998 | Branca et al. |
| 5,828,012 | A | * | 10/1998 | Repolle et al. ................ 181/175 |
| 5,834,528 | A | | 11/1998 | Tanaka et al. |
| 6,261,979 | B1 | * | 7/2001 | Tanaka et al. ................. 442/370 |
| 6,302,934 | B1 | * | 10/2001 | Nabata et al. ................... 55/486 |
| 6,487,977 | B1 | * | 12/2002 | Williams et al. ........... 108/50.12 |

(Continued)

FOREIGN PATENT DOCUMENTS

EP 2174778 * 4/2010

(Continued)

*Primary Examiner* — Ana Fortuna
(74) *Attorney, Agent, or Firm* — Hamre, Schumann, Mueller & Larson, P.C.

(57) ABSTRACT

The present invention provides a water-proof sound-transmitting membrane including a polytetrafluoroethylene (PTFE) porous membrane, in which the waterproofness is enhanced further with little lowering of the sound transmittance. The water-proof sound-transmitting membrane includes the PTFE porous membrane. The PTFE porous membrane includes a first porous layer, and a second porous layer stacked on and integrated with the first porous layer by a binding force acting between PTFE matrices. The first porous layer and the second porous layer each are composed of PTFE with a number-average molecular weight of $5.0 \times 10^7$ or more determined by a standard specific gravity method. At least one layer selected from the first porous layer and the second porous layer has an average pore diameter of 1 μm or less. The water-proof sound-transmitting membrane has a surface density of 1 g/m² to 10 g/m².

9 Claims, 6 Drawing Sheets

U.S. PATENT DOCUMENTS

| | | |
|---|---|---|
| 6,491,867 B1 * | 12/2002 | Lee et al. .................. 420/422 |
| 6,512,834 B1 * | 1/2003 | Banter et al. ................ 381/386 |
| 7,147,744 B2 * | 12/2006 | Kaz et al. .................... 156/279 |
| 7,342,793 B2 * | 3/2008 | Ristic-Lehmann et al. .. 361/708 |
| 8,141,678 B2 | 3/2012 | Ikeyama et al. |
| 2005/0018864 A1 * | 1/2005 | Minervini .................... 381/175 |
| 2009/0061205 A1 * | 3/2009 | Hokazono et al. ......... 428/316.6 |
| 2010/0206660 A1 * | 8/2010 | Horie et al. .................. 181/175 |
| 2011/0143114 A1 * | 6/2011 | Horie et al. .................. 428/219 |
| 2011/0255728 A1 * | 10/2011 | Abe et al. .................... 381/355 |

FOREIGN PATENT DOCUMENTS

| | | | |
|---|---|---|---|
| JP | 54-097686 | | 8/1979 |
| JP | 57-131236 | | 8/1982 |
| JP | 5-185506 | | 7/1993 |
| JP | 7-502940 | | 3/1995 |
| JP | 7-292144 | | 11/1995 |
| JP | 10-511307 | | 11/1998 |
| JP | 11-501973 | | 2/1999 |
| JP | 2003053872 | * | 2/2003 |
| JP | 2004-83811 | | 3/2004 |
| JP | 2005-329405 | | 12/2005 |
| JP | 2005334758 A | * | 12/2005 |
| JP | 2006-169497 | | 6/2006 |
| JP | 2008-55407 | | 3/2008 |
| JP | 2008-237949 | | 10/2008 |
| WO | 93/05960 | | 4/1993 |
| WO | 95/29950 | | 11/1995 |
| WO | 96/20040 | | 7/1996 |
| WO | 2009/011315 | | 1/2009 |

\* cited by examiner

WATER-PROOF SOUND-TRANSMITTING MEMBRANE, METHOD FOR PRODUCING THE WATER-PROOF SOUND-TRANSMITTING MEMBRANE, AND ELECTRICAL APPLIANCE INCLUDING THE WATER-PROOF SOUND-TRANSMITTING MEMBRANE

BACKGROUND OF THE INVENTION

1. Field of the Invention

The present invention relates to a water-proof sound-transmitting membrane to be used for electrical appliances with a sound function, and a method for producing the water-proof sound-transmitting membrane. The present invention also relates to an electrical appliance including the water-proof sound-transmitting membrane.

2. Description of Related Art

Electrical appliances, such as cellular phones, notebook computers, electronic notebooks, digital cameras, and game machines, are desired to have a water-proof structure because they often are used outdoors. Parts that are most difficult to have the water-proof structure in an electrical appliance are a sound emitting part and a sound receiving part, such as a speaker, a microphone, and a buzzer. Generally, a housing of the electrical appliance with the sound function has openings at positions corresponding to the sound emitting part and the sound receiving part. Sound is transmitted between the sound emitting part and outside and between the sound receiving part and the outside through these openings.

A water-proof sound-transmitting membrane is known as a member for preventing water from entering into the housing through the openings provided for the sound emitting part and the sound receiving part while ensuring a satisfactory sound transmittance. The water-proof sound-transmitting membrane is a thin film made of a material that hardly hinders the transmittance of sound. By closing the openings of the housing with the water-proof sound-transmitting membrane, it is possible to achieve both the sound transmittance and the waterproofness at these openings. As the water-proof sound-transmitting membrane, a polytetrafluoroethylene (PTFE) porous membrane preferably is used (See JP 2004-83811 A).

When the average pore diameter of the PTFE porous membrane is reduced, the waterproofness of the membrane is enhanced, but on the other hand, the surface density of the membrane is increased and the sound transmittance is lowered. That is, the waterproofness and the sound transmittance of the water-proof sound-transmitting membrane are in a trade-off relationship. Therefore, it is not easy to enhance the waterproofness without lowering the sound transmittance. In JP 2004-83811 A, both the waterproofness and the sound transmittance are achieved by specifying the average pore diameter and the surface density of the PTFE porous membrane.

In recent years, the level of the waterproofness required for electrical appliances has become higher every year. Specifically, electrical appliances are required to have a waterproofness of not only a level that allows them to be used in daily lives but also a level that allows them to be immersed in water, and furthermore, a level that allows them to be used at a predetermined depth in water for a certain period of time. However, it is not assumed that the water-proof sound-transmitting membrane disclosed in JP 2004-83811 A is used in the situation in which an electrical appliance is immersed in water.

JP 7(1995)-292144 A discloses a method for producing, although not a water-proof sound-transmitting membrane, a PTFE complex porous membrane for a high-efficiency air filter (a so-called ULPA filter or HEPA filter) used for removing fine particles in the air. In the production method (see CLAIMS) disclosed in JP 7(1995)-292144 A, a mixture containing a PTFE powder obtained by an emulsion polymerization method and a liquid lubrication agent is formed into a PTFE film by paste extrusion first. Next, the obtained film is stretched in the direction of the extrusion (a longitudinal direction, that is, an MD direction) at a temperature equal to or lower than a melting point of a sintered PTFE product, thereby forming a complex body composed of at least two stretched PTFE films stacked on each other. Subsequently, the obtained complex body is stretched in a width direction (a direction perpendicular to the longitudinal direction, that is, a TD direction), thereby forming a complex body that has been stretched in the longitudinal direction and the width direction so that an areal stretching ratio thereof is at least 50. Finally, this complex body is subject to heat setting, if needed, to obtain a high-efficiency air filter. JP 7(1995)-292144 A also describes that the above-mentioned production method makes it possible to obtain a PTFE porous membrane with a low pressure loss (with a high gas permeability), a small pore diameter, and extremely few defects such as pinholes. In addition, JP 7(1995)-292144 A describes that this porous membrane is suitable for a high-efficiency air filter (See [0014]).

SUMMARY OF THE INVENTION

The present invention is intended to provide a water-proof sound-transmitting membrane including a PTFE porous membrane, in which the waterproofness is enhanced further with little lowering of the sound transmittance. With the water-proof sound-transmitting membrane, a water immersible electrical appliance can be realized, for example.

The present inventors studied in order to realize the water immersible electrical appliance and obtained the following results.

Firstly, when a high water pressure is applied to the water-proof sound-transmitting membrane for a certain period of time or longer because the water-proof sound-transmitting membrane is immersed in water, the water pressure stretches the membrane. As a result, micropores of the membrane are deformed, allowing water to permeate through the membrane, and the membrane tends to rupture easily. Here, the tensile strength of the membrane is an important factor in achieving a high waterproofness (water pressure resistance) that allows the membrane to withstand even a certain water pressure. When the surface density of the membrane is increased, the tensile strength also is increased. However, the increased surface density lowers the sound transmittance as described above. Although it is possible to increase the tensile strength by laminating the membrane with a backing material, the sound transmittance extremely is lowered because the laminated backing material inhibits the water-proof sound-transmitting membrane from vibrating. In this description, the "high water pressure" indicates generally a water pressure of 0.01 MPa or more, particularly 0.05 MPa or more, and furthermore, approximately 0.15 MPa or more. However, even when the water pressure is lower than the high pressure, a similar phenomenon occurs in some cases where the membrane is under water pressure for a long time.

Secondly, since the water-proof sound-transmitting membrane usually is attached to an opening provided to a housing of an electrical appliance, a surface of the membrane is exposed to the outside. Thus, the membrane may be damaged by contact with foreign matters from the outside. When the membrane is damaged, the waterproofness is lost. Moreover, even when, although the membrane is not damaged, the surface of the membrane is scratched or the membrane is deformed, the water leakage and rupture of the membrane start from that area more easily when water pressure is applied thereto. This tendency becomes obvious particularly when the surface density of the water-proof sound-transmitting membrane is reduced in order to secure the sound transmittance. Thus, the puncture strength of the membrane is an important factor in coping with the contact of the foreign matters from the outside. When the surface density of the membrane is increased, the puncture strength also is increased. However, the increased surface density lowers the sound transmittance as described above.

The present inventors made intensive studies on these problems found, and have achieved the water-proof sound-transmitting membrane of the present invention. The water-proof sound-transmitting membrane of the present invention is a water-pro of sound-transmitting membrane including a PTFE porous membrane. The PTFE porous membrane includes a first porous layer, and a second porous layer stacked on and integrated with the first porous layer by a binding force acting between PTFE matrices. The first porous layer and the second porous layer each are composed of PTFE with a number-average molecular weight of $5.0 \times 10^7$ or more determined by a standard specific gravity method. At least one layer selected from the first porous layer and the second porous layer has an average pore diameter of 1 μm or less. The water-proof sound-transmitting membrane has a surface density of 1 $g/m^2$ to 10 $g/m^2$.

The production method of the present invention is a method for producing the water-proof sound-transmitting membrane of the present invention, including the steps of: extrusion-molding a paste containing a PTFE fine powder composed of PTFE with a number-average molecular weight of $5.0 \times 10^7$ or more determined by a standard specific gravity method, and a processing aid; stretching a sheet that is a molded product of the paste, or a sheet obtained by roll-pressing a molded product of the paste, in a first direction at a lower temperature than a melting point of PTFE; stacking a plurality of the sheets stretched in the first direction; stretching the stacked sheets in a second direction intersecting with the first direction, at a lower temperature than the melting point of PTFE; and sintering the sheets stretched in the second direction at a temperature equal to or higher than the melting point of PTFE, and integrating the sheets with each other by a binding force acting between PTFE matrices.

In another aspect, the production method of the present invention is a method for producing the water-proof sound-transmitting membrane of the present invention, including the steps of: extrusion-molding a paste containing a PTFE fine powder composed of PTFE with a number-average molecular weight of $5.0 \times 10^7$ or more determined by a standard specific gravity method, and a processing aid; stretching biaxially a sheet that is a molded product of the paste, or a sheet obtained by roll-pressing a molded product of the paste, at a lower temperature than a melting point of PTFE; stacking a plurality of the sheets stretched biaxially; and sintering the stacked sheets at a temperature equal to or higher than the melting point of PTFE, and integrating the sheets with each other by a binding force acting between PTFE matrices.

The electrical appliance of the present invention is an electrical appliance with a sound function, including: at least one selected from a sound emitting part for outputting sound and a sound receiving part for inputting sound; and a water-proof sound-transmitting membrane that allows sound to be transmitted between the sound emitting part and outside and/or between the sound receiving part and the outside, and suppresses entry of water into the sound emitting part and/or the sound receiving part. The water-proof sound-transmitting membrane is the water-proof sound-transmitting membrane of the present invention.

As described above, in order to achieve both the high levels of waterproofness and sound transmittance of the water-proof sound-transmitting membrane including the PTFE porous membrane, it is necessary to reduce the average pore diameter and surface density of the PTFE porous membrane, and furthermore, to increase the tensile strength and puncture strength of the membrane while keeping the surface density low.

In the water-proof sound-transmitting membrane of the present invention, a plurality of porous layers (PTFE porous layers) are stacked on and integrated with each other so that the water-proof sound-transmitting membrane has a surface density of 1 $g/m^2$ to 10 $g/m^2$. Here, at least one of the porous layers has a sufficiently small average pore diameter of 1 μm or less. Moreover, because of the fact that the plurality of the porous layers are stacked on and integrated with each other and the porous layers each is composed of PTFE with a number-average molecular weight of $5.0 \times 10^7$ or more determined by the standard specific gravity method, the high tensile strength and the high puncture strength are realized while the surface density is kept low in the range of 1 $g/m^2$ to 10 $g/m^2$ in which a satisfactory sound transmittance can be obtained.

One method for increasing the strength of the PTFE porous membrane while keeping the surface density low is to increase the stretching ratio of the membrane. This is because in the PTFE porous membrane, the orientation of PTFE molecules tends to grow when the stretching ratio is increased, leading to a higher matrix strength. Thus, when a comparison is made between a membrane with a low stretching ratio and a membrane with a high stretching ratio, the latter has a higher strength even when they have the same surface density as each other.

Moreover, when a comparison is made between a single-layer membrane and a multilayer membrane, the multilayer membrane has a higher strength when they have the same surface density and stretching ratio as each other. For example, when a comparison is made between a dual-layer membrane obtained by stretching biaxially 200 μm-thick PTFE sheets and stacking them, and a single-layer membrane obtained by stretching biaxially a 400 μm-thick PTFE sheet at the same stretching ratio as that used for obtaining the dual-layer membrane, the resulted membranes have the same surface density and the same stretching ratio as each other but the dual-layer membrane has a higher strength. This is because of the following reasons. When an unstretched PTFE sheet is obtained by roll-pressing a molded product of a paste, the pressure applied to the molded product of the paste in order to obtain the PTFE sheet with a thickness of 200 μm is higher than the pressure applied to the molded product of the paste in order to obtain the PTFE sheet with a thickness of 400 μm. When the pressure applied to the molded product of the paste is high, the binding force acting in the PTFE is increased, and the strength of the PTFE porous membrane obtained eventually also is increased. This is also the case when the roll-pressing is not performed, for example, when the paste is extrusion-molded into a sheet by using a T-slot die. Thus, for obtaining the PTFE porous membrane with a high strength, not only the stretching ratio but also the history of pressures applied to the unstretched PTFE sheet is extremely important.

Based on the above, in the water-proof sound-transmitting membrane of the present invention, the plurality of the PTFE porous membranes (porous layers) with a small average pore diameter and a low surface density, each having been stretched at a high stretching ratio, are stacked on and integrated with each other, so that both the high levels of sound transmittance and waterproofness are achieved. Here, it is important that the average molecular weight of the PTFE composing the PTFE porous membrane is equal to or more than a specified value. The effects of the present invention is not obtained when PTFE with a small average molecular weight is used.

As the molecular weight of the PTFE increases, the gas permeability of the obtained porous membrane lowers (the pressure loss increases). The reason for this, although not known clearly, is that the increase in the molecular weight of PTFE changes the network structure of the obtained porous membrane in such a manner that the gas permeability is lowered. Therefore, PTFE with a high molecular weight is not applicable to porous membranes for high-efficiency air filters, as disclosed in JP 7(1995)-292144 A, for which it is important to have a high gas permeability. In the case where PTFE with a high molecular weight is used unreasonably, the gas permeability of the membrane is thought to be somewhat increased when the porosity of the porous membrane is increased by raising the stretching ratio. On the other hand, however, the possibility of the pinholes developing is increased as also described in JP 7(1995)-292144 A (see [0010]).

In contrast, the present invention relates to the water-proof sound-transmitting membrane that does not require high gas permeability (sound is transmitted through the vibration of the membrane itself). The present invention has been accomplished by using intentionally PTFE with a high molecular weight that is unsuitable for air filters.

DETAILED DESCRIPTION OF THE INVENTION

Figure 1A:
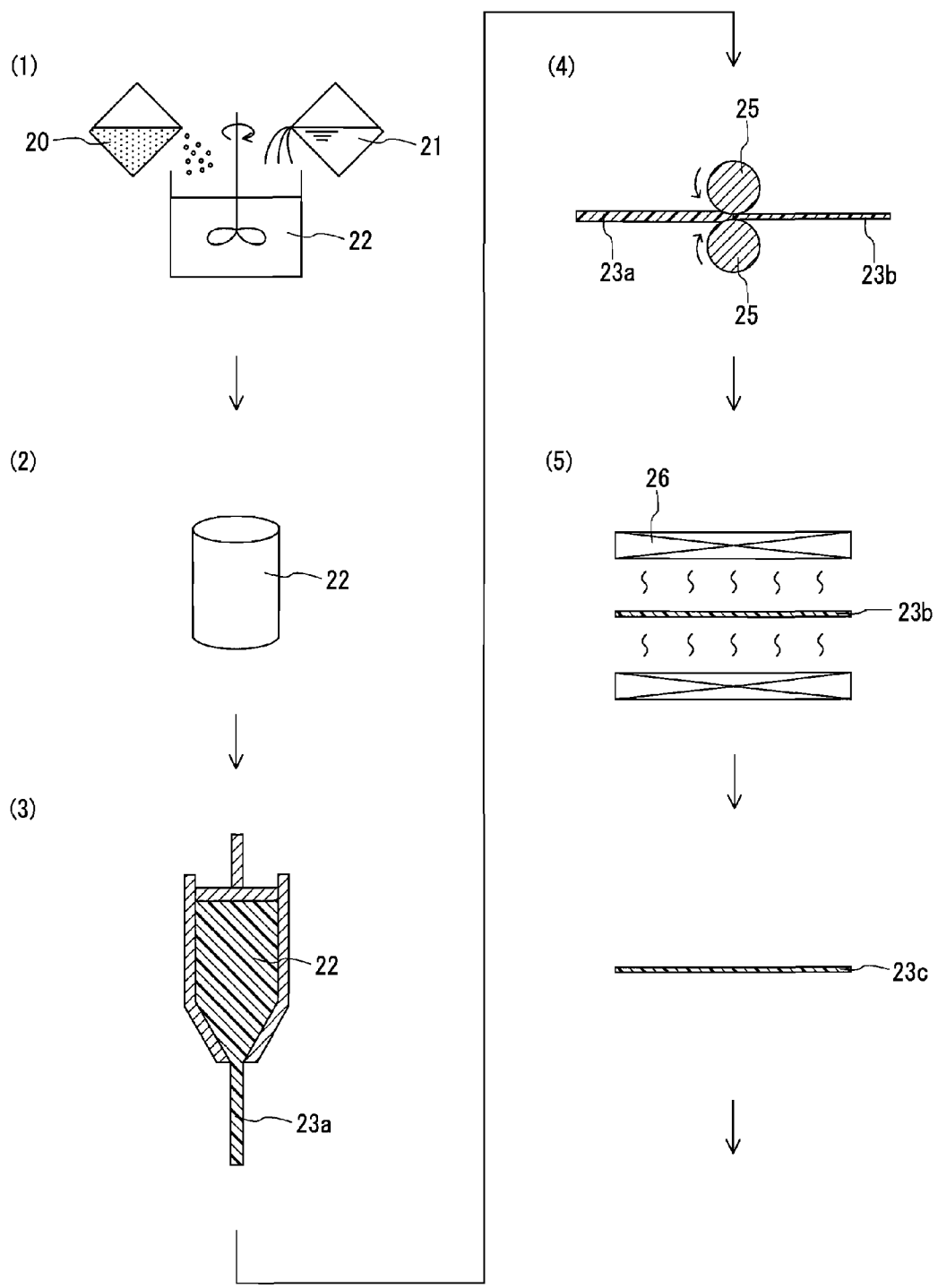
FIG. 1A is a process diagram illustrating a method for producing a water-proof sound-transmitting membrane according to an embodiment of the present invention.

Hereinafter, an embodiment of the present invention will be described with reference to the drawings. FIG. 1A is a process diagram illustrating a method for producing a waterproof sound-transmitting membrane according to an embodiment of the present invention.

(1) Paste Preparation Process

First, a mixture containing a PTFE fine powder 20 and a processing aid 21 (a liquid lubrication agent) at a specified ratio is kneaded sufficiently to prepare a paste 22 to be extrusion-molded. The PTFE composing the PTFE fine powder 20 has an average molecular weight of $5.0 \times 10^7$ or more, preferably $7.0 \times 10^7$ or more, more preferably $9.0 \times 10^7$ or more, further preferably $1.0 \times 10^8$ or more, and most preferably $1.1 \times 10^8$ or more, when denoted as a number-average molecular weight determined by a standard specific gravity method. The upper limit of the average molecular weight is not particularly limited, and it is, for example, $2.0 \times 10^8$ when denoted as the number-average molecular weight. The PTFE fine powder 20 may be a commercially-available PTFE fine powder produced by a known method such as an emulsion polymerization method as long as it satisfies the above-mentioned average molecular weight requirement. The PTFE fine powder 20 has an average particle diameter of, for example, 0.2 μm to 1.0 μm. As the processing aid 21, an organic solvent, such as naphtha and liquid paraffin, can be used. The mixing ratio of the PTFE fine powder 20 and the processing aid 21 is determined so that the content of the processing aid 21 is 15 to 30 parts by mass with respect to 100 parts by mass of the PTFE fine powder 20.

(2) Preforming Process

Next, the paste 22 containing the PTFE fine powder and the processing aid is preformed into a circular cylindrical shape. The preforming may be performed while a pressure of approximately 10 kg/cm² to 30 kg/cm² is being applied to the paste 22. Applying a sufficient pressure compresses voids (airspaces) in the paste and stabilizes properties of the paste.

(3) Extrusion Molding Process

Next, the preformed paste 22 is molded by a known extrusion method to obtain a molded product 23a with a sheet shape or a rod shape.

To obtain the sheet-shape molded product 23a, it is preferable to perform the molding so that the molded product has a tensile strength of 1 MPa or more, and more preferably 1.3 MPa or more. In this case, the PTFE porous membrane 1 obtained eventually has a higher strength and a smaller average pore diameter.

(4) Roll-pressing Process

Subsequently, the molded product 23a with a sheet shape or a rod shape is roll-pressed to obtain a strip-shaped PTFE sheet 23b. At this point, the PTFE sheet 23b has a thickness of 0.1 mm to 1.0 mm, for example. In the roll-pressing process, it is preferable to apply a sufficient pressure to the molded product 23a with a sheet shape or a rod shape. Specifically, it is preferable to adjust a clearance between pressure rolls 25, 25 so that a stretching ratio represented by (an area of the molded product 23a after being roll-pressed)/(an area of the molded product 23a before being roll-pressed) is 3 to 30 (or 5 to 20). Thereby, the binding force acting between PTFE particles is increased and the PTFE porous membrane obtained eventually has a higher strength.

When the molded product 23a before being roll-pressed is of a sheet shape, it also is possible to omit the roll-pressing process. More specifically, it also is possible to dry the molded product 23a that has been molded into a sheet shape by the extrusion method and stretch it without roll-pressing.

(5) Drying Process

Next, the roll-pressed PTFE sheet 23b is dried in a dryer 26. The ambient temperature of the dryer 26 is maintained at a lower temperature than the melting point of PTFE, for example, at 50° C. to 200° C. The drying process volatilizes the processing aid and a PTFE sheet 23c in which the content of the processing aid has been reduced sufficiently is obtained.

(6) First Stretching Process

Figure 1B:
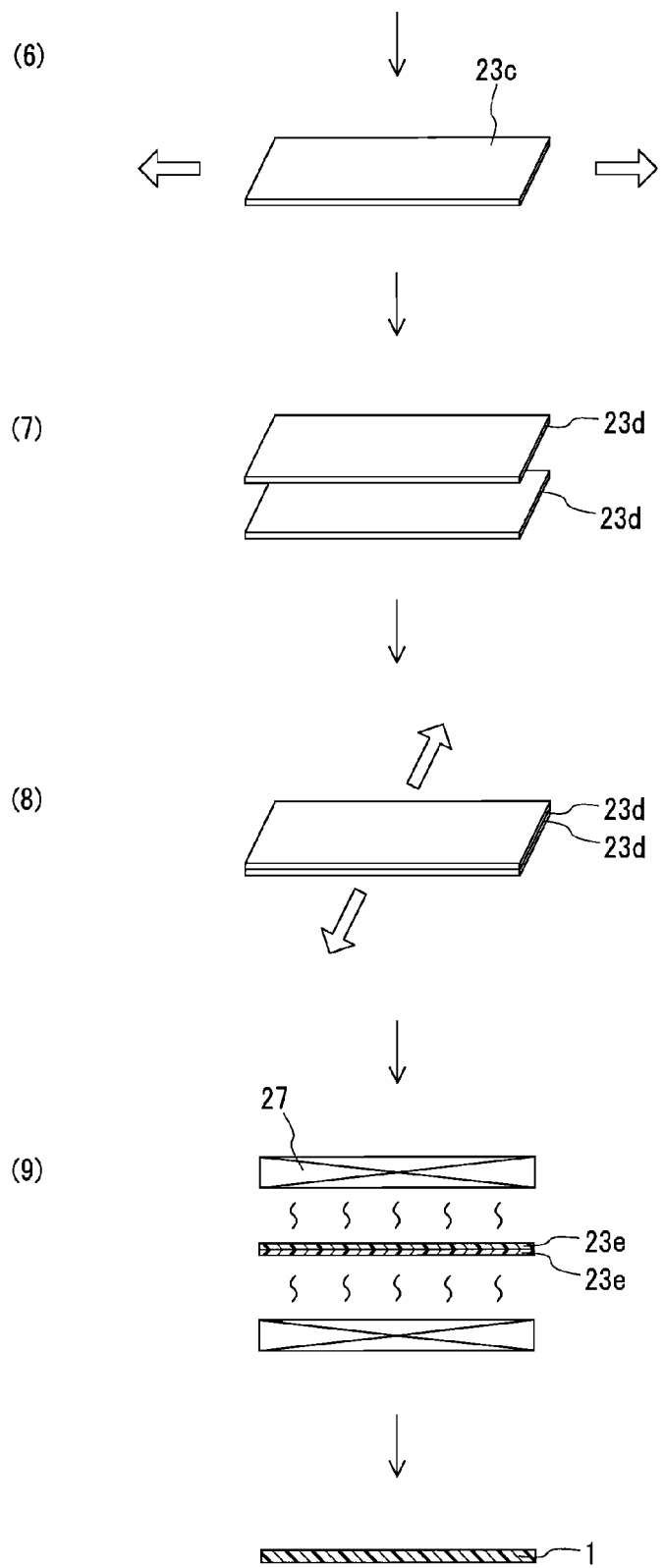
FIG. 1B is a process diagram illustrating a process following FIG. 1A.

Next, the dried PTFE sheet 23c is stretched in a longitudinal direction (MD) as shown in FIG. 1B. The stretching ratio in the longitudinal direction is 3 to 30, for example, and may be 5 to 20. Increasing the stretching ratio in the longitudinal direction to this level makes it possible to encourage sufficiently the orientation of PTFE molecules. As a result, the strength of the PTFE porous membrane is increased. The first stretching process can be performed at a temperature that allows the PTFE sheet 23c to exhibit a flexibility sufficiently and that is lower than the melting point of PTFE, for example, at 150° C. to 300° C. The first stretching process may be performed in the dryer 26 used in the drying process shown in FIG. 1A.

(7) Stacking Process

Next, two PTFE sheets 23d, 23d that have been stretched in the longitudinal direction are stacked on each other. It is preferable to perform the stacking in such a manner that the transportation route of one of the PTFE sheets 23d joins the transportation route of the other PTFE sheet 23d. This allows the two PTFE sheets 23d, 23d to be stacked on each other while being aligned in the longitudinal direction. Thus, it is not necessary to cut the PTFE sheet 23d to be stacked, and thereby an excellent productivity is achieved. Here, the number of the PTFE sheets 23d to be stacked can be determined in a range that does not complicate the process.

As described above, the strength of the PTFE porous membrane varies depending on the history of pressures applied to the unstretched PTFE sheet and the stretching ratio. In order to obtain the PTFE sheet 23b that has been roll-pressed with a higher pressure, the clearance between the pressure rolls 25, 25 may be narrowed in the roll-pressing process. The narrowed clearance between the pressure rolls 25, 25 reduces the thickness of the resulting PTFE sheet 23b. In this case, the number of the PTFE sheets 23d to be stacked in the stacking process is increased so that the surface density needed is ensured eventually. The number of the PTFE sheets 23d to be stacked can be increased also in the case of increasing the stretching ratio. Specifically, as shown in the after-mentioned Examples, the PTFE porous membrane with a three-layer structure or a four-layer structure suitably can be used for the water-proof sound-transmitting membrane.

(8) Second Stretching Process

Next, the two PTFE sheets 23d, 23d that have been stacked on each other are stretched in the width direction (TD) intersecting perpendicularly with the longitudinal direction while keeping them in the stacked state. The stretching ratio in the width direction is 3 to 100, for example, and may be 20 to 80. Together with the high stretching ratio in the longitudinal direction, the stretching ratio in the width direction increased to this level makes it possible to increase further the strength of the PTFE porous membrane. The stretching process in the width direction can be performed by a known tenter method at a lower temperature than the melting point of PTFE, for example at an ambient temperature of 50° C. to 300° C.

(9) Sintering Process

Finally, two PTFE sheets 23e, 23e that have been stretched biaxially are sintered at a temperature equal to or higher than the melting point of PTFE, for example, at 350° C. to 500° C. (the ambient temperature of a furnace 27). The sintering process allows the two PTFE sheets 23e, 23e to be integrated with each other over an entire interface therebetween by the binding force acting between the PTFE matrices. Thereby, the PTFE porous membrane 1 used for the water-proof sound-transmitting membrane is obtained. The sintering process may be performed while the two PTFE sheets 23e, 23e are being pressed, or may be performed by allowing them to contact with a press die or a heat roll.

The first and second stretching processes and the roll-pressing process are performed so that the PTFE sheets (porous layers) 23e, 23e after the sintering process have an average pore diameter of 1 μm or less. The first and second stretching processes, the roll-pressing process, and the stacking process are performed so that the PTFE porous membrane 1 obtained after the sintering process has a surface density of 1 g/m² to 10 g/m². The first and second stretching processes, the roll-pressing process, and the stacking process are preferably performed so that the PTFE porous membrane 1 obtained after the sintering process has a tensile strength of 10 MPa to 100 MPa, and a value obtained by dividing a puncture strength by the surface density is 25 kPa·m²/g to 50 kPa·m²/g.

In the present embodiment, a plurality of stretched membranes are stacked. The stretched membranes have been stretched at a lower temperature than the melting point of PTFE and at a high stretching ratio so as to have a small average pore diameter and a higher matrix strength. Thereby, it is possible to provide the water-proof sound-transmitting membrane with higher waterproofness than that of a single-layer membrane, although its surface density is the same as that of the single-layer membrane. Here, the stretching at a high stretching ratio means to stretch at an areal stretching ratio of 500 to 10000, preferably 1000 to 10000, and more preferably 2000 to 10000, in total of the first and second stretching processes and the roll-pressing process.

In the production methods shown in FIG. 1A and FIG. 1B, the stacking process is performed between the first stretching process and the second stretching process. However, the first stretching process and the second stretching process may be performed successively. More specifically, a plurality of the unstretched PTFE sheets may be stacked, and then the stacked PTFE sheets may be stretched biaxially by a known stretching method such as the tenter method.

When the biaxial stretching process is performed after the stacking process, the porous structure may lack uniformity. This is because a tension is applied differently between a portion near the interface between the stacked PTFE sheets and a portion apart from the interface. The porous structure lacking uniformity affects the sound transmittance. In contrast, in the present embodiment, the stacking and the stretching in the width direction are performed after micropores are formed by the stretching in the longitudinal direction, so a good-quality porous structure comparable to those of conventional monolayers is formed. Moreover, the handleability of the PTFE sheet that has been stretched in the longitudinal direction is higher than that of the unstretched PTFE sheet. Thus, in the present embodiment, the stacking process can be performed accurately, and a problem, such as air bubbles trapped between the sheets, hardly occurs. Furthermore, the unstretched sheets do not adhere to each other easily when being stacked, but the sheets that have been stretched in the longitudinal direction can adhere to each other easily and uniformly.

By performing the stacking process between the stretching process in the longitudinal direction and the stretching process in the width direction as in the present embodiment, it is possible to produce the PTFE porous membrane with two layers whose stretching ratios in the longitudinal direction are different from each other. This particular PTFE porous membrane is effective in products (the water-proof sound-transmitting membranes) that require fine adjustments of the surface density and thickness.

It also is possible to stack a plurality of the PTFE sheets that have been stretched biaxially in advance and integrate them by sintering. However, since the PTFE sheets after being stretched in the width direction have a very large area in the actual production process, it may be difficult to stack them in this order.

In contrast, when the stacking is performed before the stretching in the width direction is performed, the stacking is easy because the PTFE sheets each have a small width, and defects, such as wrinkles and cracks, hardly occur in the PTFE sheets at the time of stacking. As a result, it is possible to suppress a decrease in the yield due to the addition of the stacking process. As shown in FIG. 1B, the stretching in the longitudinal direction is performed before the stacking in the present embodiment. Since the longitudinal direction of the PTFE sheet usually is along the roll-pressing direction and the transportation direction, the area expansion in the longitudinal direction does not affect the handleability of the PTFE sheet significantly and hardly tends to raise the difficulty of the stacking.

In the production method of the present invention, a process other than the above-mentioned processes may be performed at an arbitrary point in time, if necessary. This process may be a stretching process other than the first and second stretching processes.

Figure 2A:
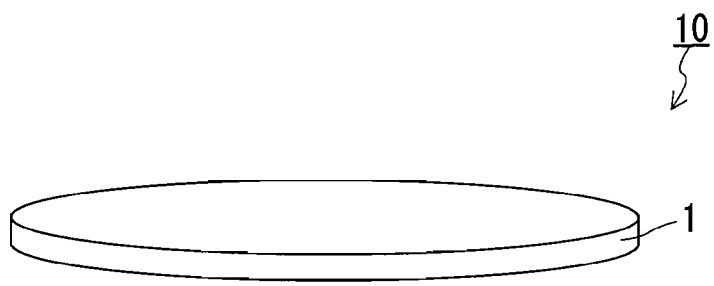
FIG. 2A is a perspective view showing an example of the water-proof sound-transmitting membrane of the present invention.
Figure 2B:
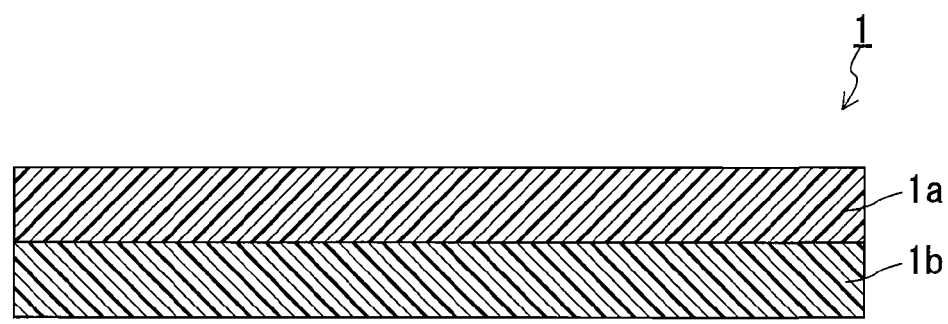
FIG. 2B is a cross-sectional view of the water-proof sound-transmitting membrane shown in FIG. 2A.

A water-proof sound-transmitting membrane 10 shown in FIG. 2A and FIG. 2B can be produced by the above-mentioned method.

The water-proof sound-transmitting membrane 10 shown in FIG. 2A is composed of the PTFE porous membrane 1 with a disk shape. As shown in FIG. 2B, the PTFE porous membrane 1 as the waterproof sound-transmitting membrane 10 includes a first porous layer 1a and a second porous layer 1b. The second porous layer 1b is stacked on and integrated with the first porous layer 1a by the binding force acting between the PTFE matrices. According to the production method described with reference to FIG. 1A and FIG. 1B, the first porous layer 1a has substantially the same matrix structure as that of the second porous layer 1b. In other words, the first porous layer 1a is stretched biaxially in stretching directions conforming to those of the second porous layer 1b, respectively, and the stretching ratios at which the first porous layer 1a is stretched biaxially are the same, with respect to the respective stretching directions, as the stretching ratios at which the second porous layer 1b is stretched biaxially. Moreover, the first porous layer 1a has the same thickness as that of the second porous layer 1b.

The water-proof sound-transmitting membrane 10 has a surface density of 1 g/m$^2$ to 10 g/m$^2$ (in total of the plurality of layers). The water-proof sound-transmitting membrane 10 with the surface density in such a range has a sufficient physical strength as well as a small sound transmission loss and an excellent sound transmittance. Preferably, the water-proof sound-transmitting membrane 10 has a surface density of 2 g/m$^2$ to 10 g/m$^2$, more preferably 2 g/m$^2$ to 7 g/m$^2$.

At least one layer selected from the first porous layer 1a and the second porous layer 1b has an average pore diameter of 1 μm or less. In order to enhance the waterproofness, each of the layers preferably has an average pore diameter of 1 μm or less. The water-proof sound-transmitting membrane 10 can have high waterproofness by allowing the first porous layer 1a and the second porous layer 1b constituting the water-proof sound-transmitting membrane 10 to have an average pore diameter of 1 μm or less. Preferably, the porous layers 1a, 1b have an average pore diameter of 0.7 μm or less, and more preferably 0.5 μm or less. A decrease in the average pore diameter of the porous layers 1a, 1b lowers the gas permeability of the water-proof sound-transmitting membrane 10. However, the gas permeability of the membrane does not affect the sound transmittance significantly because sound is transmitted through the vibration of the membrane itself. The lower limit of the average pore diameter is not particularly limited, and it is 0.1 μm, for example.

As a method for measuring the average pore diameter, a measuring method described in ASTM F316-86 generally has been widespread, and automated measuring apparatuses are marketed (Perm-Porometer available from Porous Material Inc., U.S., for example). In this method, the PTFE porous membrane immersed in a fluid with a known surface tension is fixed to a holder and a pressure is applied from one side so as to allow the fluid to come out through the membrane, and then the average pore diameter is determined from this pressure. This method is excellent not only because it is simple and has a high reproducibility but also because it can automate the measuring apparatus completely.

The porosity of each of the first porous layer 1a and the second porous layer 1b is not particularly limited. Preferably, it is 60% to 95%, and more preferably 75% to 95%.

It is preferable that the water-proof sound-transmitting membrane 10 has a tensile strength of 10 MPa to 100 MPa. A tensile strength within this range allows the water-proof sound-transmitting membrane 10 to have higher waterproofness (higher water pressure resistance). More preferably, the water-proof sound-transmitting membrane 10 has a tensile strength of 20 MPa to 75 MPa. From the viewpoint of the water pressure resistance of the water-proof sound-transmitting membrane 10, it basically is preferable when the water-proof sound-transmitting membrane 10 has as high a tensile strength as possible. However, the tensile strength of the water-proof sound-transmitting membrane 10 is within the above-mentioned ranges, taking into consideration the above-mentioned ranges of the surface density, that is, the sound transmittance of the water-proof sound-transmitting membrane 10. When the tensile strength of the water-proof sound-transmitting membrane 10 varies with direction, it is preferable that the tensile strength in the direction that minimizes the tensile strength is 10 MPa to 100 MPa.

It is preferable that the water-proof sound-transmitting membrane 10 has a puncture strength of 25 kPa·m$^2$/g to 50 kPa·m$^2$/g as a value obtained by dividing by the surface density. A puncture strength within this range allows the water-proof sound-transmitting membrane 10 to have higher waterproofness. From the viewpoint of the waterproofness of the water-proof sound-transmitting membrane 10, it basically is preferable when the water-proof sound-transmitting membrane 10 has as high a puncture strength as possible. However, the puncture strength of the water-proof sound-transmitting membrane 10 is within the above-mentioned range, taking into consideration the above-mentioned ranges of the surface density, that is, the sound transmittance of the water-proof sound-transmitting membrane 10. The reason why the value obtained by dividing by the surface density is used as the puncture strength is because the puncture strength is affected by the surface density of the membrane more strongly than the tensile strength. The puncture strength is, for example, 100 kPa to 500 kPa when not divided by the surface density.

The water-proof sound-transmitting membrane 10 may be subject to a water repellent treatment using a water repellent agent, such as fluoropolymer, in order to increase further the waterproofness of the membrane.

Figure 3:
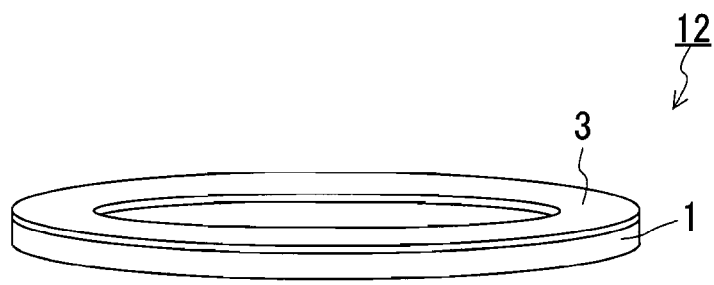
FIG. 3 is a perspective view showing another example of the water-proof sound-transmitting membrane of the present invention.

The water-proof sound-transmitting membrane of the present invention may include a frame fixed around a periphery of the PTFE porous membrane 1. FIG. 3 shows a water-proof sound-transmitting membrane 12 in which a ring-shaped frame 3 is attached around the periphery of the PTFE porous membrane 1. According to the embodiment in which the ring-shaped frame 3 is provided in this way, it is possible to reinforce the PTFE porous membrane 1, making it easy to handle the water-proof sound-transmitting membrane 12. Moreover, since the frame 3 serves as an attachment width to the housing of an electrical appliance, the work of attaching the water-proof sound-transmitting membrane 12 to the housing becomes easy. Furthermore, the water-proof sound-transmitting membrane 12 of this type can ensure higher sound transmittance than that of an embodiment in which a net or the like serving as a support body is adhered to the entire surface of the PTFE porous membrane 1 because the sound-transmitting portion of the water-proof sound-transmitting membrane 12 is merely composed of the PTFE porous membrane 1.

The material for the frame 3 is not particularly limited, and a thermoplastic resin or metal is preferable. Examples of the thermoplastic resin include: polyolefin such as polyethylene (PE) and polypropylene (PP); polyester such as polyethylene terephthalate (PET); polycarbonate (PC); polyimide; and a composite of these. Examples of the metal include metal with an excellent corrosion resistance, such as stainless steel and aluminum.

The ring-shaped frame 3 has a thickness of, for example, 5 μm to 500 μm, and preferably 25 μm to 200 μm. Preferably, the width of the ring (a difference between an outer diameter and an inner diameter) is approximately 0.5 mm to 2 mm to serve as the attachment width to the housing of the electrical appliance. A foamed material made of a resin mentioned above also can be used for the ring-shaped frame 3.

The method for adhering the PTFE porous membrane 1 to the frame 3 is not particularly limited. For example, the adhesion may be performed by a method such as heat welding, ultrasonic welding, adhesion using an adhesive, and adhesion using a double-sided tape. Particularly, the adhesion using a double-sided tape is preferable because it adheres the PTFE porous membrane 1 to the frame 3 easily.

Figure 4A:
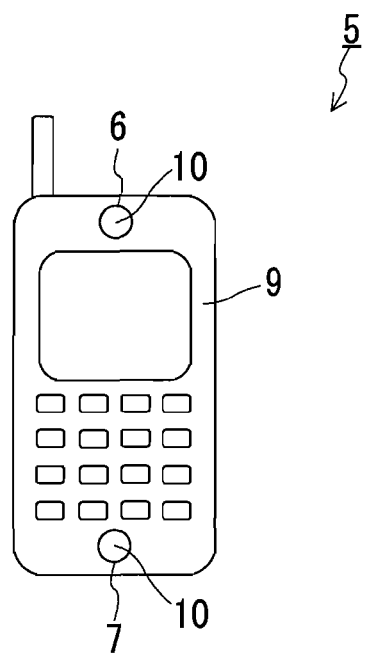
FIG. 4A is a front view showing an example of a cellular phone including the water-proof sound-transmitting membrane.
Figure 4B:
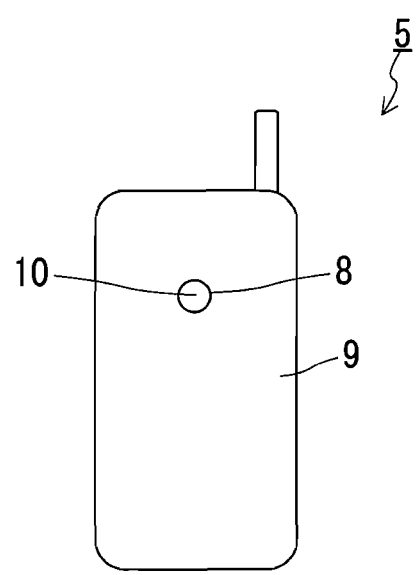
FIG. 4B is a rear view showing the example of the cellular phone including the water-proof sound-transmitting membrane.

FIG. 4A and FIG. 4B show an example of an electrical appliance including the water-proof sound-transmitting membrane 10. The electrical appliance shown in FIG. 4A and FIG. 4B is a cellular phone 5. A housing 9 of the cellular phone 5 is provided with openings for a sound emitting part and a sound receiving part, such as a speaker 6, a microphone 7, and a buzzer 8. The water-proof sound-transmitting membrane 10 is attached to the housing 9 from the inside so as to close these openings. This prevents water and dust from entering into the housing 9 and protects the sound emitting part and the sound receiving part. The water-proof sound-transmitting membrane 10 is attached to the housing 9 by a method such as adhesion using a double-sided tape, thermal welding, high frequency welding, and ultrasonic welding, so as to prevent water from entering thereinto through a joint portion between the water-proof sound-transmitting membrane 10 and the housing 9.

The water-proof sound-transmitting membrane 10 is applicable not only to the cellular phone 5 but also to electrical appliances including at least one selected from a sound emitting part for outputting sound and a sound receiving part for inputting sound. Specifically, the water-proof sound-transmitting membrane 10 is applicable to various kinds of electrical appliances with a sound function, such as a notebook computer, an electronic notebook, a digital camera, and a portable audio device.

Figure 5A:
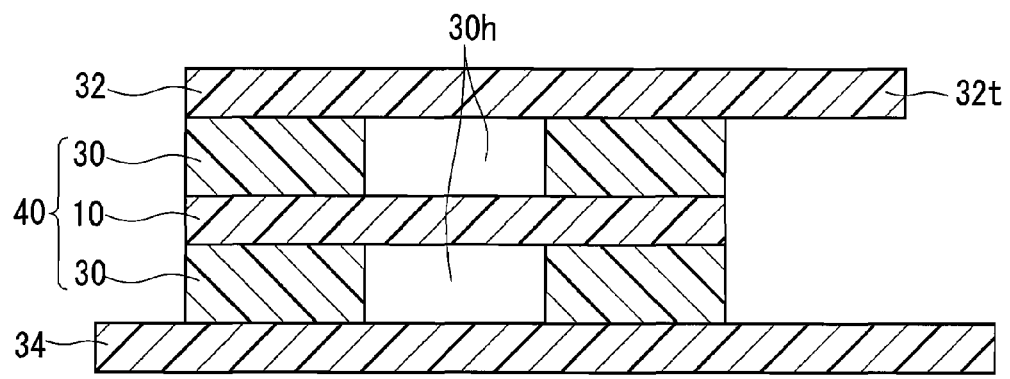
FIG. 5A is a cross-sectional view showing an example of the water-proof sound-transmitting membrane held between two separators.

The water-proof sound-transmitting membrane 10 can be provided in the form of an assembly in which a double-sided tape is adhered to each of a front surface and a rear surface of the water-proof sound-transmitting membrane 10. As shown in FIG. 5A, an assembly 40 has the water-proof sound-transmitting membrane 10 and two double-sided tapes 30 each adhered to the front surface and the rear surface of the water-proof sound-transmitting membrane 10. The double-sided tapes 30 each has the shape of a ring or a frame when viewed in plane. The water-proof sound-transmitting membrane 10 is exposed at opening portions 30h of the double-sided tapes 30. A mounting separator 34 is provided on one surface of the assembly 40, and a tabbed separator 32 is provided on another surface of the assembly 40. Since the assembly 40 is held between the two separators 32, 34, the water-proof sound-transmitting membrane 10 can be protected in a reliable manner and the work of attaching to an adherend, such as the housing of a cellular phone, becomes easy.

Figure 5B:
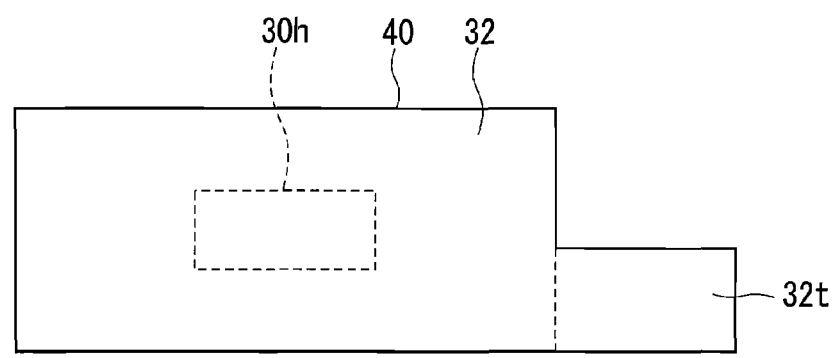
FIG. 5B is a plan view of the water-proof sound-transmitting membrane shown in FIG. 5A.

The separator 32, together with the assembly 40, can be separated from the mounting separator 34. As shown in the plan view of FIG. 5B, a tab 32t of the separator 32 is formed so as to protrude outward from an outer edge of the assembly 40. It is possible to adhere the assembly 40 to the adherend, such as the housing of a cellular phone, while holding the tab 32t of the separator 32. The separator 32 easily can be separated from the assembly 40 by pulling the tab 32t. In this way, it is possible to attach the water-proof sound-transmitting membrane 10 to the adherend without touching the water-proof sound-transmitting membrane 10 directly, and thereby the chances of damaging the water-proof sound-transmitting membrane 10 during the attachment work are reduced. The possibility for the adherend to be scratched also is reduced.

The separators 32, 34 may be made of a resin, such as polyethylene, polypropylene, and polyethylene terephthalate, or may be made of paper. In the mounting separator 34, a portion to which the assembly 40 is attached may be embossed. It is preferable that an adhesive strength (180° peel adhesive strength) between the tabbed separator 32 and the double-sided tape 30 is higher than the adhesive strength between the mounting separator 34 and the double-sided tape 30. In this case, the tabbed separator 32 together with the assembly 40 can be separated easily from the mounting separator 34.

Usually, the single tabbed separator 32 is provided to the single assembly 40. In contrast, the mounting separator 34 may be shared by a large number of the assemblies 40, or the single mounting separator 34 may be provided to the single assembly 40. The product of the latter case can be obtained by placing the tabbed separator 32 on the assembly 40, and then punching out the mounting separator 34 into a size larger than the tabbed separator 32.

Figure 6A:
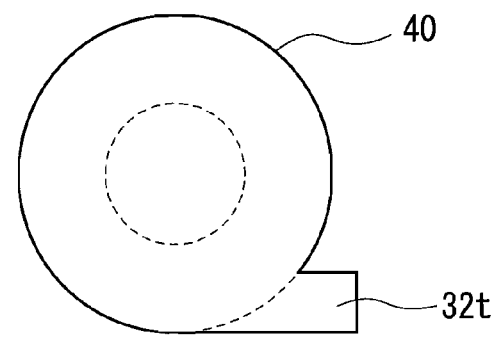
FIG. 6A is a plan view showing other examples of the separator and the water-proof sound-transmitting membrane.
Figure 6B:
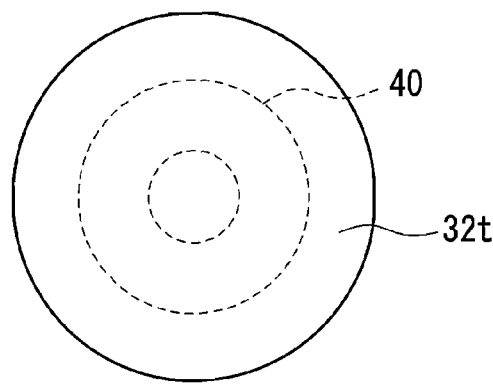
FIG. 6B is a plan view showing still other examples of the separator and the waterproof sound-transmitting membrane.
Figure 6C:
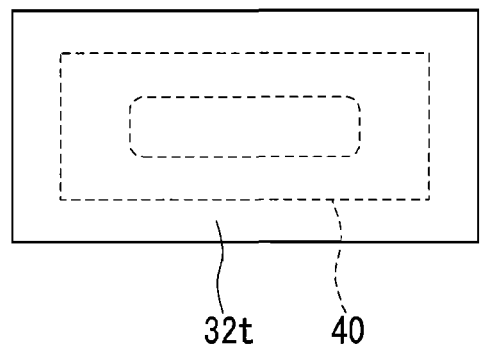
FIG. 6C is a plan view showing yet other examples of the separator and the water-proof sound-transmitting membrane.

The shapes of the assembly 40 and the tabbed separator 32 are not particularly limited. The assembly 40 may be circular as shown in FIG. 6A. The tab 32t may be formed along the entire circumference of the assembly 40 as shown in FIG. 6B. Or, as shown in FIG. 6C, it also is possible that the assembly 40 is rectangular and the tab 32t has the shape of a frame surrounding the assembly 40 when viewed in plane.

EXAMPLES

Hereinafter, the present invention will be described in more detail with reference to examples. The present invention, however, is not limited to the following examples.

First, a method for calculating the number-average molecular weight of PTFE by the standard specific gravity method, and a method for evaluating various properties of the produced PTFE porous membrane will be described.

[Calculation of the Number-average Molecular Weight of PTFE by the Standard Specific Gravity Method]

Number-average molecular weight Mn of PTFE was calculated by substituting a standard specific gravity (SSG) of PTFE determined according to JIS K6935-2 into formula (1) below. The formula (1) appears on page 36 of Fluoroplastics Handbook (Takaomi Satokawa, issued by Nikkan Kogyo Shimbun Ltd., 1990).

$$SSG = -0.0579 Mn + 2.6113 \quad (1)$$

[Average Pore Diameter]

As described above, the average pore diameter of each of the porous layers constituting the PTFE porous membrane was measured according to ASTM F316-86, using a Perm-Porometer manufactured by Porous Material Inc. A fluorine solvent (FC-40 produced by 3M Company, with a surface tension of 16 mN/m) was used for the measurement.

[Surface Density]

The surface density of the PTFE porous membrane was measured as follows. The PTFE porous membrane was punched with a φ47 mm punch, and then the punched-out portion was measured for mass. The measurement was converted into mass per 1 m$^2$ to use as the surface density.

[Tensile Strength]

The tensile strength of the PTFE porous membrane was measured as follows. The porous membrane was punched into the shape of Specimen No. 2 shown in JIS K7113, and then the obtained specimens were subject to a tensile test using a tensile tester (a tensilon universal tester, model RTC-1310 A-PL, manufactured by A & D Company, Ltd.) under the following conditions. The tensile strength was measured in both of the longitudinal direction (MD) and the width direction (TD) of the PTFE porous membrane.

Distance between chucks: 95 mm
Pulling rate: 200 mm/minute
Measurement temperature: 25° C.

The tensile strength was defined as a value obtained by dividing a maximum load (N) measured when the PTFE porous membrane ruptured in the tensile test by a cross-sectional area (mm$^2$) of the PTFE porous membrane measured before the tensile test. The specimens each had a width of 6 mm. The thickness of each of the specimens was measured with a dial gage.

[Puncture Strength]

The puncture strength of the PTFE porous membrane was measured as follows.

First, a central part of a double-sided tape (a 30 mm×30 mm square) was punched out to make a φ16 mm round hole, and the PTFE porous membrane to be measured was adhered thereto in such a manner that the membrane did not become wrinkled. Subsequently, the exposed portion of the PTFE porous membrane was punctured (at a puncturing rate of 2 cm/second) with a needle (with a needle diameter of 2.0 mm) using a compression tester (KES-G5 manufactured by Kato Tech Co., Ltd), and a maximum load was read from a load displacement curve measured at that time. The maximum load was divided by the needle diameter and the resulted value was defined as the puncture strength (kPa). The puncture test was conducted at 25° C.

[Water Pressure Resistance]

The water pressure resistance of the PTFE porous membrane was measured using a water resistance tester (high water pressure method) described in JIS L1092. Since use of an area specified in JIS L1092 deforms the membrane significantly at the measurement, the measurement was made while suppressing the deformation by placing a stainless steel mesh (with an opening diameter of 2 mm) on a surface of the membrane opposite to a surface to which the pressure was applied.

[Water Pressure Resistance Holding Test]

The water pressure resistance holding test for the PTFE porous membrane was conducted using the water resistance tester described in JIS L1092 as in the water pressure resistance test. Specifically, the PTFE porous membrane was applied with a water pressure of 150 kPa (equivalent to a water pressure at a depth of 15 m), held for 1 hour, and then was checked for leakage and evaluated. Since use of an area specified in JIS L1092 deforms the membrane significantly at the measurement, the measurement was made while suppressing the deformation by placing a stainless steel mesh (with an opening diameter of 3 mm) on a surface of the membrane opposite to a surface to which the pressure was applied. The criterion for the evaluation was as follows.

1: No leakage
2: Slight water leakage observed within 30 minutes to 1 hour
3: Water leakage observed within 30 minutes.
4: Ruptured

Example 1

100 parts by weight of a PTFE fine powder (Polyflon F101HE produced by Daikin Industries Ltd.) and 20 parts by weight of a liquid lubrication agent (naphtha) were kneaded uniformly to prepare a paste containing the PTFE fine powder and naphtha. This paste was preformed into a circular cylindrical shape at 20 kg/cm$^2$. Next, the obtained circular cylindrical preformed product was extrusion-molded to obtain a sheet-shaped molded product. The obtained sheet-shaped molded product was measured for tensile strength (the distance between chucks was 10 mm and the width of the sample was 10 mm in the measurement). As a result, the tensile strength was 1.8 MPa both in the longitudinal direction (MD) and the width direction (TD).

Subsequently, while containing the liquid lubrication agent, the sheet-shaped molded product was made go through between a pair of metal pressure rolls to form a long sheet with a thickness of 200 μm. The long sheet continuously was made pass through a dryer at a temperature of 150° C. so as to stay therein for 5 minutes to remove the liquid lubrication agent by being dried. Thus, a PTFE sheet was produced.

The number-average molecular weight of the PTFE fine powder used was determined by the standard specific gravity method, and it was $1.1 \times 10^8$.

The PTFE sheet produced as mentioned above was stretched 13 times in the longitudinal direction in the dryer at an ambient temperature of 290° C. Furthermore, four of the PTFE sheets that had been stretched in the longitudinal direction were stacked and stretched 45 times in the width direction at an ambient temperature of 150° C. by the tenter method. Then, the biaxially-stretched PTFE sheets were sintered (at a sintering temperature of 400° C., which was also applied to the after-mentioned examples and comparative examples). Thus, a PTFE porous membrane with a four-layer structure was obtained.

Example 2

The PTFE sheet produced in Example 1 was stretched 8 times in the longitudinal direction in the dryer at an ambient temperature of 290° C. Furthermore, two of the PTFE sheets that had been stretched in the longitudinal direction were stacked and stretched 31.5 times in the width direction at an ambient temperature of 150° C. by the tenter method. Then, the biaxially-stretched PTFE sheets were sintered. Thus, a PTFE porous membrane with a dual-layer structure was obtained.

Example 3

The PTFE sheet produced in Example 1 was stretched 10 times in the longitudinal direction in the dryer at an ambient temperature of 290° C., and further was stretched 60 times in the width direction at an ambient temperature of 150° C. by the tenter method. Then, three of the biaxially-stretched PTFE sheets were stacked and sintered. Thus, a PTFE porous membrane with a three-layer structure was obtained.

Example 4

The PTFE sheet produced in Example 1 was stretched 6.5 times in the longitudinal direction in the dryer at an ambient temperature of 290° C. Furthermore, two of the PTFE sheets that had been stretched in the longitudinal direction were stacked and stretched 45 times in the width direction at an ambient temperature of 150° C. by the tenter method. Then, the biaxially-stretched PTFE sheets were sintered. Thus, a PTFE porous membrane with a dual-layer structure was obtained.

Comparative Example 1

The PTFE sheet produced in Example 1 was stretched 6 times in the longitudinal direction in the dryer at an ambient temperature of 290° C., and further was stretched 20 times in the width direction at an ambient temperature of 150° C. by the tenter method. Then, the PTFE sheet was sintered. Thus, a PTFE porous membrane with a single layer structure was obtained.

Comparative Example 2

The PTFE sheet produced in Example 1 was stretched 4 times in the longitudinal direction in the dryer at an ambient temperature of 290° C., and further was stretched 20 times in the width direction at an ambient temperature of 150° C. by the tenter method. Then, the PTFE sheet was sintered. Thus, a PTFE porous membrane with a single layer structure was obtained.

Comparative Example 3

A PTFE sheet was produced as in Example 1, except for that another PTFE fine powder (Polyflon F104 produced by Daikin Industries Ltd.) was used instead of the PTFE fine powder (Polyflon F101HE produced by Daikin Industries Ltd.). The number-average molecular weight of the PTFE fine powder used was determined by the standard specific gravity method, and it was $4.0 \times 10^7$.

The PTFE sheet produced as mentioned above was stretched 13 times in the longitudinal direction in the dryer at an ambient temperature of 290° C. Furthermore, four of the PTFE sheets that had been stretched in the longitudinal direction were stacked and stretched 45 times in the width direction at an ambient temperature of 150° C. by the tenter method. Then, the biaxially-stretched PTFE sheets were sintered. Thus, a PTFE porous membrane with a four-layer structure was obtained.

Table 1 shows the stretching ratio, number of the porous layers stacked, thickness, average pore diameter, and porosity of the respective PTFE porous membranes produced in Examples 1 to 4 and Comparative Examples 1 to 3. Table 2 shows the results of evaluations on other various properties.

TABLE 1

|  | Stretching ratio | Number of layers stacked | Thickness of membrane (μm) | Porosity (%) | Average pore diameter (μm) |
|---|---|---|---|---|---|
| Example 1 | 13 × 45 | 4 | 11 | 82 | 0.20 |
| Example 2 | 8 × 31.5 | 2 | 10 | 82 | 0.22 |
| Example 3 | 10 × 60 | 3 | 10 | 83 | 0.22 |
| Example 4 | 6.5 × 45 | 2 | 14 | 84 | 0.25 |
| C. Example 1 | 6 × 20 | 1 | 13 | 85 | 0.29 |
| C. Example 2 | 4 × 20 | 1 | 21 | 86 | 0.24 |
| C. Example 3 | 8 × 31.5 | 2 | 12 | 85 | 0.48 |

TABLE 2

|  | Surface density (g/m²) | Tensile strength (MPa) MD | Tensile strength (MPa) TD | Puncture strength (kPa) | Puncture strength per unit surface density (kPa · m²/g) | Water pressure resistance (MPa) | Water pressure resistance holding test |
|---|---|---|---|---|---|---|---|
| Example 1 | 4.2 | 62.6 | 21.6 | 178 | 42.4 | 0.60 | 1 |
| Example 2 | 4.0 | 40.0 | 18.3 | 138 | 34.5 | 0.50 | 2 |
| Example 3 | 3.7 | 48.0 | 25.7 | 148 | 40.0 | 0.55 | 1 |
| Example 4 | 4.8 | 30.9 | 19.9 | 138 | 28.8 | 0.54 | 1 |
| C. Example 1 | 4.3 | 28.2 | 9.0 | 88 | 20.6 | 0.47 | 4 |
| C. Example 2 | 6.3 | 19.0 | 7.1 | 89 | 14.1 | 0.47 | 3 |
| C. Example 3 | 4.0 | 23.2 | 5.5 | 39 | 9.8 | 0.15 | 4 |

As shown in Tables 1 and 2, all of the PTFE porous membranes had almost the same surface density as each other. Thus, it is conceived that all of these samples had almost the same level of sound transmittance as each other. However, Comparative Example 3, for which PTFE with a number-average molecular weight of $4.0 \times 10^7$ determined by the standard specific gravity method was used, had significantly low waterproofness (water pressure resistance) in spite of the fact that the Comparative Example 3 had a multilayer structure. Comparative Examples 1 and 2 had low waterproofness (water pressure resistance) because they had a single-layer structure, although the same PTFE as in Examples was used for Comparative Examples 1 and 2. This indicates that Examples, which have multilayer structures, exhibit higher waterproofnesses than those of Comparative Examples even when their surface densities are comparable to those of Comparative Examples. Furthermore, when comparisons were made among all of the porous membranes of Examples, one with more layers tends to exhibit a higher waterproofness.

The present invention is applicable to various other embodiments unless they depart from the intentions and the essential features of the invention. The embodiments disclosed in this description are to be considered in all respects as illustrative and not limiting. The scope of the invention is indicated by the appended claims rather than by the foregoing description, and all changes that come with the meaning and range of equivalency of the claims are intended to be embraced therein.

Industrial Applicability

The water-proof sound-transmitting membrane of the present invention can, for example, provide high waterproofness to an electrical appliance having a sound function while ensuring the sound transmittance of the electrical appliance. The water-proof sound-transmitting membrane of the present invention suitably is used for electrical appliances that recently have been used in a wider range of areas, such as beach and forest, besides ordinary indoor and outdoor environments.

What is claimed is:

1. A water-proof sound-transmitting membrane comprising a polytetrafluoroethylene (PTFE) porous membrane, wherein:
   the PTFE porous membrane includes a first porous layer, and a second porous layer stacked on and integrated with the first porous layer by a binding force acting between PTFE matrices;
   each of the first porous layer and the second porous layer is composed of PTFE with a number-average molecular weight of $5.0 \times 10^7$ or more as determined by a standard specific gravity method;
   at least one layer selected from the first porous layer and the second porous layer has an average pore diameter of 1 µm or less; and
   the water-proof sound-transmitting membrane has a surface density of 1 g/m² to 10 g/m².

2. The water-proof sound-transmitting membrane according to claim 1, wherein the water-proof sound-transmitting membrane has a tensile strength of 10 MPa to 100 MPa.

3. The water-proof sound-transmitting membrane according to claim 1, wherein a value obtained by dividing a puncture strength of the water-proof sound-transmitting membrane by the surface density of the membrane is 25 kPa·m²/g to 50 kPa·m²/g.

4. The water-proof sound-transmitting membrane according to claim 1, wherein:
   each of the first porous layer and the second porous layer is a biaxially-stretched layer; and
   stretching ratios of the first porous layer are the same as stretching ratios of the second porous layer.

5. The water-proof sound-transmitting membrane according to claim 4, wherein the first porous layer is stretched biaxially in stretching directions conforming to those of the second porous layer, respectively, and the stretching ratios at which the first porous layer is stretched biaxially are the same, with respect to the respective stretching directions, as the stretching ratios at which the second porous layer is stretched biaxially.

6. A method for producing the water-proof sound-transmitting membrane of claim 1, comprising the steps of:
   extrusion-molding a paste containing a polytetrafluoroethylene (PTFE) fine powder composed of PTFE with a number-average molecular weight of $5.0 \times 10^7$ or more determined by a standard specific gravity method, and a processing aid;
   stretching a sheet that is a molded product of the paste, or a sheet obtained by roll-pressing a molded product of the paste, in a first direction at a lower temperature than a melting point of PTFE;
   stacking a plurality of the sheets stretched in the first direction;
   stretching the stacked sheets in a second direction intersecting with the first direction, at a lower temperature than the melting point of PTFE; and
   sintering the sheets stretched in the second direction at a temperature equal to or higher than the melting point of PTFE, and integrating the sheets with each other by a binding force acting between PTFE matrices.

7. A method for producing the water-proof sound-transmitting membrane of claim 1, comprising the steps of:
   extrusion-molding a paste containing a polytetrafluoroethylene (PTFE) fine powder composed of PTFE with a number-average molecular weight of $5.0 \times 10^7$ or more determined by a standard specific gravity method, and a processing aid;
   stretching biaxially a sheet that is a molded product of the paste, or a sheet obtained by roll-pressing a molded product of the paste, at a lower temperature than a melting point of PTFE;
   stacking a plurality of the sheets stretched biaxially; and
   sintering the stacked sheets at a temperature equal to or higher than the melting point of PTFE, and integrating the sheets with each other by a binding force acting between PTFE matrices.

8. An electrical appliance with a sound function, comprising: at least one selected from a sound emitting part for outputting sound and a sound receiving part for inputting sound; and a water-proof sound-transmitting membrane that allows sound to be transmitted between the sound emitting part and outside and/or between the sound receiving part and the outside, and suppresses entry of water into the sound emitting part and/or the sound receiving part,
   wherein the water-proof sound-transmitting membrane is the water-proof sound-transmitting membrane of claim 1.

9. The water-proof sound-transmitting membrane according to claim 1, wherein each of the first porous layer and the second porous layer is composed of PTFE with a number-average molecular weight of more than $5.0 \times 10^7$.

* * * * *